United States Patent [19]

Franken et al.

[11] 4,289,374
[45] Sep. 15, 1981

[54] METHOD OF AND DEVICE FOR PROVIDING A CONCENTRIC ENVELOPE ON AN END OF AN OPTICAL FIBER, AND FIBER HAVING AN END PROVIDED WITH A CONCENTRIC ENVELOPE IN ACCORDANCE WITH THE METHOD

[75] Inventors: Adrianus J. J. Franken; Giok D. Khoe; Gerard Kuyt; Johannes H. F. M. Van Leest; Antonius J. A. Nicia; Cornelis J. T. Potters; Hendricus F. G. Smulders, all of Eindhoven, Netherlands

[73] Assignee: U.S. Philips Corporation, New York, N.Y.

[21] Appl. No.: 78,733

[22] Filed: Sep. 25, 1979

[30] Foreign Application Priority Data

Sep. 26, 1978 [NL] Netherlands .................. 7809725

[51] Int. Cl.³ .............................................. G02B 5/14
[52] U.S. Cl. ................................. 350/96.20; 350/320; 356/138
[58] Field of Search .............. 350/96.15, 96.18, 96.20, 350/96.21, 320; 356/138, 153, 154, 399

[56] References Cited

U.S. PATENT DOCUMENTS

| | | | |
|---|---|---|---|
| 3,902,784 | 9/1975 | Dakss et al. | 350/96.21 X |
| 3,938,895 | 2/1976 | Bridger et al. | 350/96.20 X |
| 3,998,554 | 12/1976 | Burch et al. | 356/138 |
| 3,999,841 | 12/1976 | Dakss et al. | 350/320 |
| 4,167,304 | 9/1979 | Gelbke | 350/96.21 |

FOREIGN PATENT DOCUMENTS

| | | | |
|---|---|---|---|
| 2626243 | 12/1977 | Fed. Rep. of Germany | 350/96.21 |
| 2002136 | 2/1979 | United Kingdom | 350/96.18 |
| 530172 | 11/1976 | U.S.S.R. | 356/138 |

OTHER PUBLICATIONS

Sullivan, "Alignment of Rotational Prisms", *Applied Optics*, vol. 11, No. 9, Sep. 1972, pp. 2028–2032.
Nicia, "Practical Low-Loss Lens Connector for Optical Fibres", *Electronics Letters*, vol. 14, No. 16, Aug. 1978, pp. 511–512.

*Primary Examiner*—John K. Corbin
*Assistant Examiner*—John D. Lee
*Attorney, Agent, or Firm*—Marc D. Schechter

[57] ABSTRACT

The invention relates to a method of and a device for providing an outer surface of an envelope which is concentric to a light-conductive core, around a monomode optical fiber. According to the invention, the eccentricity of the fiber and the envelope may be for example, 0.1 μm for a core diameter of 3 μm. This accuracy is acieved by splitting a light beam, emerging from the end of a fiber which is clamped in an envelope, into two subbeams by means of rotating optical means, each of the beams producing a circular image. By a suitable choice and adjustment of the optical means, the two light beams will form oppositely moving images when the fiber end is displaced with respect to the axis of rotation and observation. When the images are concentric, the fiber end is situated on the axis of rotation. Machining of the envelope by the use of a tool which rotates around the axis of rotation results in an envelope which is concentric to the light-conductive core of the fiber.

14 Claims, 13 Drawing Figures

METHOD OF AND DEVICE FOR PROVIDING A CONCENTRIC ENVELOPE ON AN END OF AN OPTICAL FIBER, AND FIBER HAVING AN END PROVIDED WITH A CONCENTRIC ENVELOPE IN ACCORDANCE WITH THE METHOD

BACKGROUND OF THE INVENTION

The invention relates to a method of providing an envelope on an end of an optical fiber, an outer surface of the envelope being at least partly concentric to a light conductive core of the fiber end. The method first involves the positioning of the fiber end opposite optical observation means, after which light is radiated into the fiber via another end of the optical fiber. A light beam emerging from the end of the fiber is observed via the optical means, the fiber end being displaced in two directions, which extend transverse to each other and transverse to the light beam, until the light beam observed occupies a predetermined position with respect to an axis of observation.

The invention furthermore relates to a device for performing the method and to a fiber having an end provided with an envelope in accordance with the inventive method.

A method and a device, as well as an end of an optical fiber provided with an envelope, of the described kind are known from U.S. Pat. No. 3,999,841. According to the described method, the optical fiber as well as the envelope to be secured thereto are independently centered with respect to an axis of observation. The light which is conducted via the fiber and which emerges from the end forms a round light spot which is observed by means of a microscope and which is centered in the microscope by means of a sight with cross hairs. For the positioning of the envelopeuse is made of a dummy envelope which comprises a throughopening which extends concentrically to an outer surface. The dummy envelope is secured in a support and the edge of the opening is observed via the microscope. The edge of the opening is centered with respect to the sight by adjusting means on the support, the edge thus being imaged in a well-focussed manner. Apart from unavoidable tolerances, the support is accurately positioned with respect to the sight in the microscope. Subsequently, the dummy envelope is removed and the envelope to be mounted is arranged in the support, after which the fiber end can be secured in the envelope, for example, by means of a setting epoxy adhesive. The ultimate, undesirable eccentricity of the light-conductive fiber core with respect to the outer surface of the envelope is determined by the sum of the tolerances occurring during centering of the optical fiber as well as of the dummy envelope with respect to the optical axis, during the manufacture of the concentric opening of the dummy envelope, and during the manufacture of dummy envelope and envelopes of the same diameters. The shrinkage occurring during the setting of the epoxy resin is also a fault source which causes eccentricity of the fiber core with respect to the envelope.

The accuracy of centering (the undesirable tolerance occurring) is furthermore determined by the optical means whereby the light emerging from the end of the optical fiber is observed. These tolerances and the optical means used are the reasons why a very high accuracy of the concentricity ($+0.5$ $\mu$m) of the outer surface with respect to the light-conductive fiber core cannot be achieved.

SUMMARY OF THE INVENTION

An object of the invention is to provide a method and a device in which these tolerances are avoided as much as possible and whereby an end of a monomode optical fiber can be provided with an envelope which is concentric with respect to the light-conductive fiber core to a very high degree (0.1–0.2 $\mu$m).

To this end, the method according to the invention is characterized in that an envelope is provided on the end of the fiber, after which the fiber end with the envelope is arranged in a support. The light beam emerging from the end of the fiber is then split into two subbeams by optical means which is arranged to be rotatable around the axis of observation. Eccentrically with respect to an optical axis of the part of the optical means which splits the light beam, each of the beam parts forms a circular image. Movement of the fiber end in a direction transverse to the axis of observation causes the images to move in opposite directions with respect to each other and transverse to the axis of observation. After the envelope with the fiber end is displaced in two directions which extend transversely to each other such that the circular images are concentric, the light-conductive core is then situated on the axis of observation. Finally the envelope is provided with an outer surface which is concentric to the axis of observation by means of machining tool which rotates around the axis of observation of the optical system.

The method according to the invention achieves a very high accuracy of the concentricity of the outer surface of the envelope with respect to the light-conductive core. This is because no separate positioning is required for the fiber and the envelope which is disposed thereon. The envelope is provided, by means of a machining means, with a surface which is concentric with respect to an axis of rotation which is also the axis of observation during the positioning of the fiber core. Moreover the accuracy of the optical means for determining the position of the fiber core is such that eccentricities smaller than the wavelength of visible light are observed. The light beam emerging from the end of the fiber is split into two parts, each of which forms a circular image due to the rotation of a part of the optical observation means. Because the images move in opposite directions with respect to each other in reaction to the displacement of the fiber core with respect to the axis of observation, the sensitivity of the optical observation means is actually doubled, which is of course attractive. The concentricities, and hence the symmetry, of the images is decisive as regards the position of the fiber core. The two images form a reference with respect to each other as it were, so that an external reference is no longer required (for example, a sight, cross hairs, etc.) and no adjustment inaccuracy can occur between the reference and the axis of observation and rotation. Furthermore, the circular images need not be very well defined, thus allowing positioning of the fiber core with an accuracy which is smaller than the wavelength of the light used. When a monomode optical fiber is provided with a concentric envelope by means of the method according to the invention, the light (wavelength of between 0.4 and 0.7 $\mu$m) emerging from the light-conductive core (diameter 2–8 $\mu$m) will not form a well-focussed image.

A device for providing an envelope on an end of an optical fiber, at least a part of an outer surface of the envelope being concentric to the light-conductive core of the fiber, according to the method according to the invention, comprises a frame with a support in which the envelope can be secured. The device further comprises adjusting means for adjusting the position of the support with respect to the frame, and optical means for observing a light beam emerging from the end of the optical fiber. The device also comprises drive means, for rotating at least a part of the optical means and a machining means around an axis of observation, the machining means being arranged to be rotatable, together with the part of the optical system, around the axis of observation in order to machine at least a part of the outer surface of the envelope.

A part of the optical means and the machining means of the device are mechanically rigidly coupled and are rotatable about the axis of observation. As a result, the machining means will describe a concentric path with respect to the axis of observation, so that the only remaining tolerance is the eccentricity of the fiber core with respect to the axis of observation which is allowed by the adjusting accuracy.

A preferred embodiment of a device according to the invention is characterized in that the machining means and the rotating optical observation means are displaceable parallel to the axis of observation. Use is made of the recognition of the fact that the machining means always forms a surface which is concentric to the axis of observation if the rotating machining means is translated along the axis of rotation and observation. The sole tolerance then remaining, which determines the eccentricity of the core of the fiber with respect to the machined outer surface of the envelope, is the adjustment of the core of the fiber with respect to the axis of observation.

A further embodiment of a device according to the invention is characterized in that the rotating part of the optical observation means comprises an objective, a semitransparent mirror and a pentaprism, an optical axis of the objective extending outside the axis of observation, substantially parallel thereto. The optical axis of the objective and the axis of observation enclose an angle of substantially 45° with respect to the semitransparent mirror which transmits part of the light transmitted through the objective and which reflects the other part to the pentaprism which reflects the light in substantially the same direction as followed by the light transmitted by the mirror. This embodiment of the device utilizes conventional optical means, the effective surfaces of which are to be prepared in a known manner, which is an advantage.

An optical fiber having an end provided with an envelope according to the invention is characterized in that the fiber comprises an envelope provided with an abutment edge at one end, the edge forming a light press fit with a bushing arranged around the envelope. The bushing comprises a conical, internal surface at its end which is nearest to the abutment edge, a spherical lens being secured on the conical surface opposite the end of the optical fiber. A monomode optical fiber end provided with such an envelope offers the advantage that the fiber can be coupled by methods which are customarily used for coupling multimode optical fibers whereby the distance between and the position of the fiber ends to be coupled are not very critical.

BRIEF DESCRIPTION OF THE DRAWING

The invention will be described in detail hereinafter with reference to the accompanying diagrammatic drawing.

FIG. 7 shows a part of the device shown in FIG. 6a.

DESCRIPTION OF THE PREFERRED EMBODIMENTS

Figure 1:
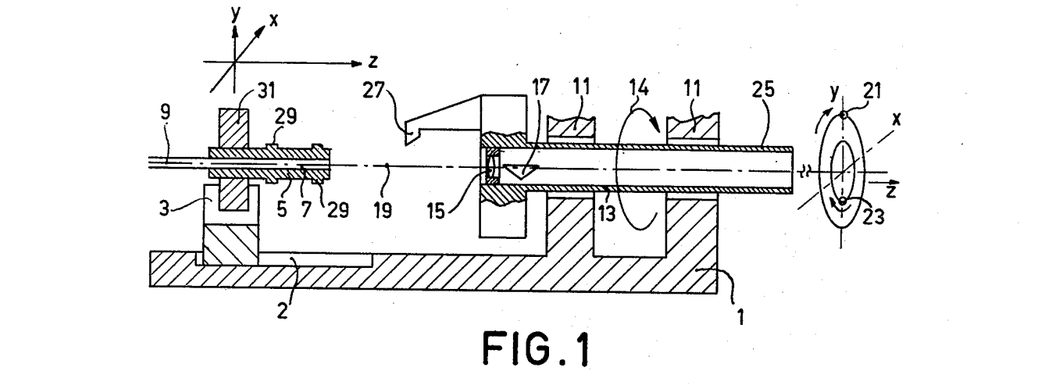
FIG. 1 shows the principle of the device for performing the method according to the invention.

The device according to the invention which is shown in FIG. 1 comprises a frame 1 with a micromanipulator 3 on which a support 31 is provided for securing an end 7 of a monomode optical fiber 9 provided with an envelope 5. Frame 1 also comprises supports 11 in which a tubular housing 13 is rotatably arranged as denoted by an arrow 14. In the housing 13 there are arranged an objective 15 and a reversing prism 17 which form a beam splitting assembly. The objective 15 as well as the reversing prism 17 are eccentrically arranged with respect to the axis of rotation 19, the optical axis of the objective 15 coinciding substantially with the long side face of the prism 17. The rectangular side faces at the short sides of the prism 17 extend perpendicular to the plane through the axis of rotation 19 and the optical axis of the objective 15.

Part of the light emerging from the end 7 of the fiber 9 will pass only through the objective 15, while the remainder passes through the objective 15 as well as through the reversing prism 17. Each part of the light causes a light spot 21 and 23, respectively, which can be observed at the end 25 of the housing 13. As a result of the use of the reversing prism 17, a displacement of the fiber end 7 in the x-direction or the y-direction will cause displacement of the light spots 21 and 23 in the x-direction or the y-direction, but in opposite directions with respect to each other. As the housing 13 with the objective 15 and the reversing prism 17 rotates, each light spot will create a circular image because the objective 15 and the reversing prism 17 are eccentrically arranged with respect to the axis of observation and rotation 19. The circular images will be concentric only if the end 7 of the fiber 9 is situated on the axis of observation and rotation 19. It is to be noted that the long side of the reversing prism 17 encloses a small angle with respect to the optical axis of the objective 15 in order to prevent coincidence of the circular images.

If the end 7 is not situated on the axis of observation and rotation 19, the circular images will be eccentric as will be explained hereinafter. When the fiber end 7 is displaced, the images will move in opposite directions with respect to each other. As a result, a light-conductive core of the fiber end 7 can be quickly and accurately positioned on the axis 19 by means of the (micro) manipulator 3. Because the human eye is sensitive to symmetry in images, it can be readily observed whether the images formed are concentric or eccentric.

When the core of the fiber end 7 has been positioned on the axis 19, abutment edges 29 of the envelope 5 are machined by means of a tool 27 by translation of the micromanipulator 3 with the support 31 along the axis 19, so that each abutment edge 29 is provided with an outer surface which is concentric to the light-conductive core of the fiber end 7. The frame 1 comprises a slot 2 for movement of the micromanipulator 3.

Figure 2A:
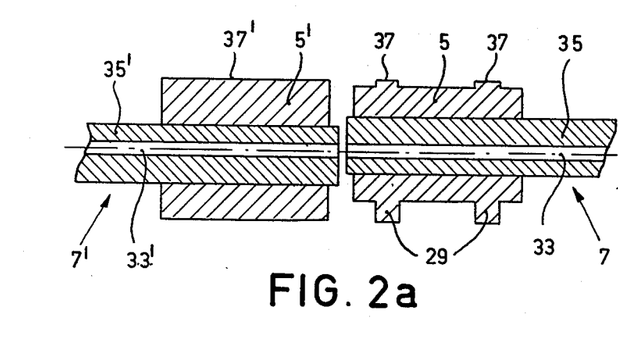
FIGS. 2a and 2b show an embodiment of two optical fiber ends provided with concentric envelopes according to the invention.

FIG. 2a shows two ends 7 and 7' of monomode optical fibers provided with envelopes 5 and 5' respectively. The fiber ends 7 and 7' comprise light-conductive cores 33 and 33' and a jackets 35 and 35'. The cores 33 and 33' are rarely concentric to the outer surface of the jackets 35 and 35' and have a diameter of from 2 to 8 μm, while the eccentricity of the core may be of the same order of magnitude. These facts often lead to difficulties when monomode optical fibers are coupled to each other.

Figure 2B:
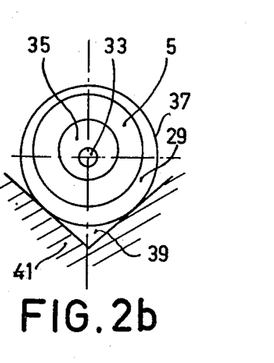

Using a device as described with reference to FIG. 1 the envelopes 5 and 5' are provided with surfaces 37 and 37', which are concentric to the light-conductive cores 33 and 33', after which two fiber ends 7, 7' thus machined can be coupled by known methods which are suitable for coupling multimode optical fibers. The outer surface of multimode optical fibers forms a reference face on which the fibers are aligned. This method can now also be used for monomode optical fibers provided with a concentric envelope according to the invention. In a frequently described coupling for multimode fibers, the ends of optical fibers are arranged in a V-groove. FIG. 2b diagrammatically shows how an end 7 of a monomode optical fiber, provided with an envelope 5, is arranged in a holder 41 comprising such a V-groove 39. The further reference numerals used in FIG. 2b correspond to the reference numerals used in FIG. 2a.

The outer surface 37' of the envelope 5' is concentric to the light-conductive core 33'. The entire outer surface 37' of the envelope 5' should, therefore be machined in the manner described with reference to FIG. 1. The envelope 5, however, comprises two abutment edges 29, each of which is provided with an outer surface 37 which is concentric to the light-conductive core 33, so that it is not necessary to machine the entire envelope, but only the abutment edges 29 via which the envelope 5 bears in the V-groove 39 as shown in FIG. 2b. Obviously, the V-groove 39 in the holder 41 should exhibit as few irregularities as possible, because the alignment of the fiber cores 7 and 7' with respect to each other is adversely influenced thereby. The alignment of envelopes comprising two abutment edges 29 will be least affected by such irregularities.

Figure 3:
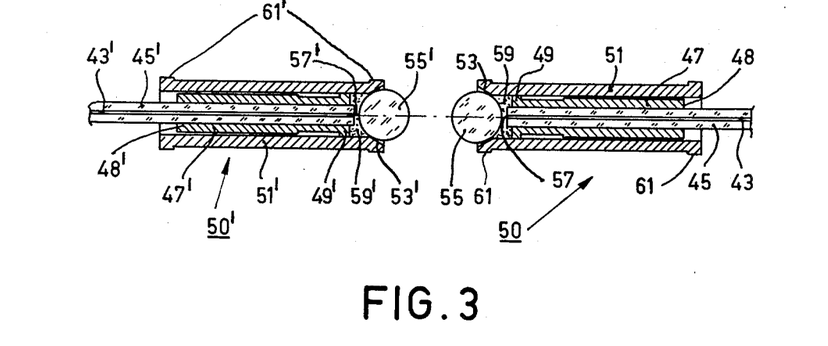
FIG. 3 shows a preferred embodiment of a coupling of two optical fibers provided with a concentric envelope according to the invention.

FIG. 3 shows a preferred embodiment of a coupling between two monomode light-conductive cores 43 and 43' of fibers 45 and 45' which are provided with envelopes 47 and 47', respectively, by means of the device according to the invention. Each of the envelopes 47 and 47' comprises an abutment edge 49 and 49' respectively. The fibers 45 and 45' are arranged, by way of their envelopes, in bushings 51 and 51' which are each provided with a bore which is accurately adapted to the diameter of the abutment edges 49 and 49'. The bushings 51 and 51' comprise openings 53 and 53', respectively, which adjoin the bore and which are concentric thereto. The openings accommodate ball lenses 55 and 55', respectively. Between the end faces 57 and 57' of the fibers 45 and 45' and the lenses 55, 55' there is provided a coupling liquid 59 and 59' which has a refractive index which is adapted to the refractive index of the lenses 55 and 55' and that of the fiber cores 43 and 43'. The bushings 51 and 51' are provided with supporting edges 61 and 61' on which the bushings 51 and 51' bear when they are arranged, for example, in a V-shaped groove (not shown). As will be described hereinafter, a groove of this kind is not subject to such severe requirements as regards tolerances as a result of the use of the lenses 55 and 55'.

The fiber ends 45 and 45', the envelopes 47 and 47', the bushings 51 and 51', the lenses 55 and 55 and the coupling liquid 59 and 59' together form connector parts 50 and 50' respectively. The bores of the bushings 51 and 51' form light press fits with the abutment edges 49 and 49'. The abutment edges 49 and 49' are concentric to the light-conductive cores 43 and 43'. Furthermore, the conical openings 53 and 53' are concentric to the bores in the bushings 51 and 51'; this can be simply realized, for example, by providing the bores and the openings in direct succession during the clamping of the bushings 51 and 51' in a lathe. The lenses 55 and 55' arranged in the conical openings 53 and 53', thus have optical axes which are concentric within very narrow tolerances to the fiber cores 43 and 43' to be introduced into the bushings 51 and 51'. Therefore, the lens 55 forms a substantially parallel beam from the light emerging from the fiber end face 57, the beam being converged by the lens 55' to the end face 57' of the light-conductive core 43'. The tolerances as regards the mutual position of and the distance between the two partial connectors 50 and 50' will not be as critical as the tolerances of a coupling where the fiber ends are coupled directly to each other. This offers advantages particularly for couplings where it must be possible to break and restore the coupling quickly and/or often.

The envelopes 47 and 47' each require only one abutment edge 49 and 49' in given circumstances. The ends of the fiber cores 43 and 43' should preferably be directed perpendicularly to the surface of the lenses 55 and 55', where the light enters or emerges in order to prevent undesirable losses. No unacceptable losses will occur if deviations from the "perpendicular" entering or emerging are small with respect to the numerical aperture of the fibers (less than 1°). If the difference between the diameters of the abutment edge 49 and the end 48 of the envelope 47, divided by the distance between the edge 49 and the end 48, is smaller than $15.10^{-3}$ this requirement is often satisfied.

Figure 4A:
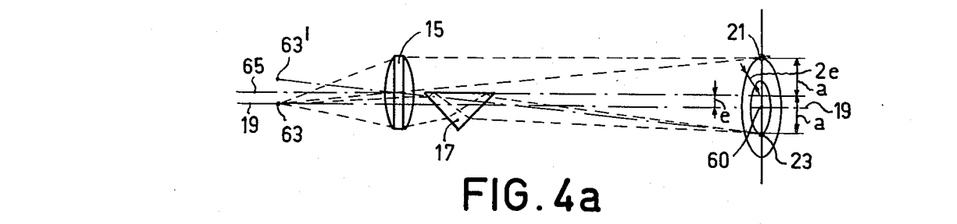
FIGS. 4a and 4b show an embodiment of an optical system for a device according to the invention.
Figure 4B:
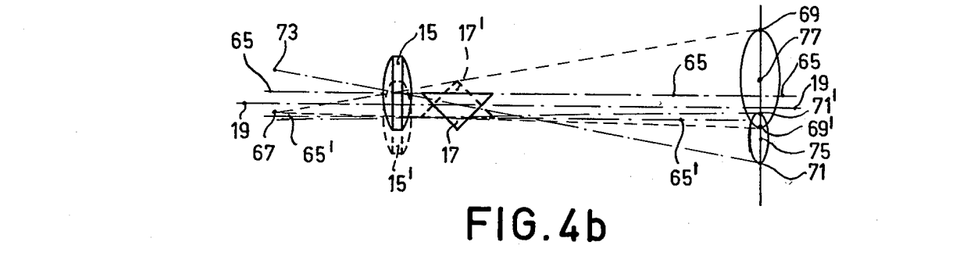

With reference to FIGS. 4a and 4b, a description will be given of the method (used in FIG. 1) of obtaining two circular images from the light emerging from the end 7, the images being displaced in opposite directions with respect to each other upon displacement of the fiber end 7. FIG. 4a shows the objective 15, the reversing prism 17 and also the axis of rotation 19. A light source 63 is arranged on the axis of rotation 19. The optical axis 65 of the objective 15 extends parallel to the axis of rotation 19 at a distance e (approximately 10 μm). The light source 63 forms an image 21 via the objective 15. Via the objective 15 and the reversing prism 17, a second image 23 of the light source 63 is obtained. The image 23 is the image, via the objective, of the "mirrored" light source 63' which is a mirror image of the light source 63 with respect to the optical axis 65. Thus, the images 21 and 23 are symmetrically situated at a distance a from the optical axis 65. When the objective 15 and the reversing prism 17 perform a rotation about the axis of rotation 19, the images 21 and 23 both describe a circle, the center of which is situated on the axis of rotation 19. The distance between the circles amounts to 2.e; this can be adjusted by more or less eccentric arrangement of the objective 15 and the prism 17 with respect to the axis of rotation 19.

The circles produced by means of the light source 63 will not form a well-defined image if the light source is small (2–8 μm) with respect to the wavelength of the light (0.4–0.7 μm). The fact that these images are not very well defined is not objectionable, because for the positioning of the fiber end (light source 63) with respect to the axis of observation and rotation 19 it is merely necessary to establish whether or not the circles are concentric. A vague boundary of the circles imaged does not influence the sensitivity of the edge for making a distinction between concentric and eccentric circles (symmetrical and asymmetrical images, respectively).

In FIG. 4b., a light source 67 is arranged adjacent the axis of rotation 19. Via the objective 15, an image 69 is formed. Via the objective 15 and the reversing prism 17, a second image 71 is formed which may be considered as an image of the light source 73 which is a mirror image of the light source 67 with respect to the optical axis 65. After rotation through 180° C. of the objective 15 and the prism 17 around the axis of rotation 19, these components occupy the positions 15' and 17'. The optical axis 65' of the objective 15' is then situated at a different distance from the light source 67 which is stationary. Via the objective 15', an image 69' of the light source 67 is formed. Furthermore via the objective 15' and the reversing prism 17, a second image 71' is formed which is a mirror image of the image 69' with respect to the optical axis 65'. Continuous rotation of the objective 15 and the reversing prism 17 produces circular images, which are generated by means of a light source 67, and whose extremes are situated in the points 69 and 69' and 71 and 71', respectively. Each of the images has a center 75 and 77 which are situated mirror-image like with respect to the axis of observation and rotation 19. As the light source 67 is situated nearer to the axis of rotation 19, the centers 75 and 77 will also be situated nearer to the axis of rotation 19. The centers 75 and 77 coincide only when the light source is situated on the optical axis 19 (light source 63, FIG. 4a), the centers then being situated on the optical axis 19 (point 60, FIG. 4a) and the images being concentric.

Figure 5A:
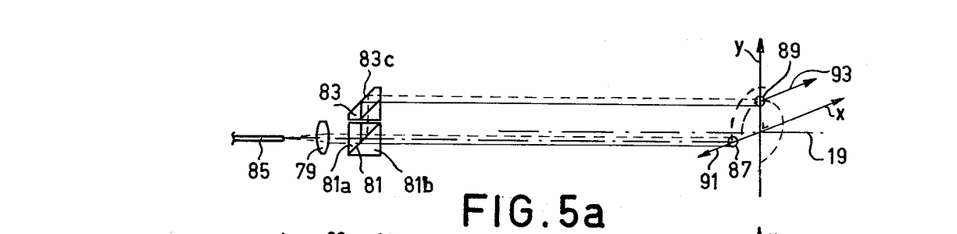
FIGS. 5a, and 5b, and 5c show a further embodiment of an optical system for a device according to the invention.
Figure 5B:
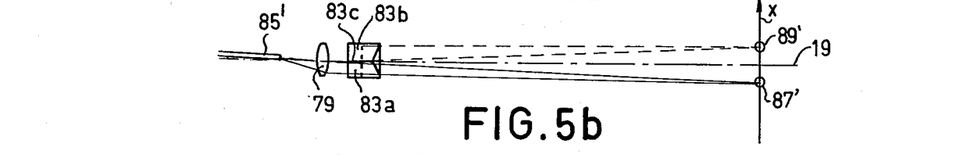
Figure 5C:
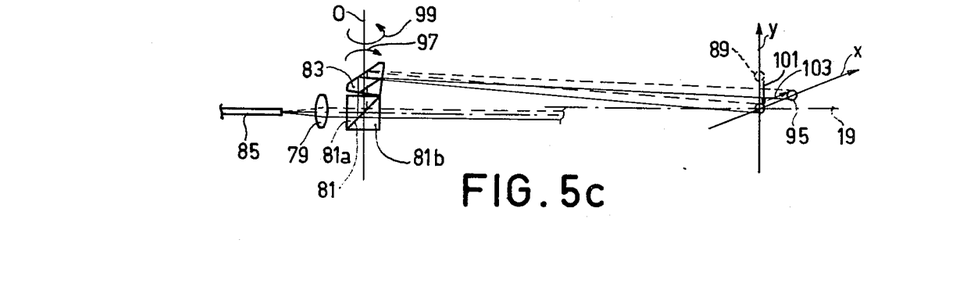

A further optical subsystem which can be used in an embodiment of a device according to the invention will be described with reference to FIGS. 5a, 5b, and 5c. The subsystem comprises an objective 79, a semitransparent mirror 81, formed by the interface of two prisms 81a and 81b, and a double-reflecting semiprism 83. It is to be noted that the axis of observation and rotation 19 of the rotating part of the optical observation means extends through the origin of the x-y system of coordinates. Furthermore in the position shown the optical axis of the objective 79 is shifted in the +x-direction with respect to the axis 19, and the prisms 81a and 81b and semiprism 83 are stacked in the +y-direction. The light emerging from a fiber end 85 is incident on the semitransparent mirror 81 via the objective 79. The part of the light which is transmitted by the mirror 81 forms an image 87 on the x-axis. The part reflected by the mirror 81 forms a second image 89 via the semiprism 83. When the optical subsystem is rotated, the images 87 and 89 will each describe a circular path (only partly shown in FIG. 5a by broken lines) in the x-plane and the y-plane shown. When the fiber end 85 is displaced in the +x-direction (see FIG. 5b), the image 87 will be displaced in the −x-direction and the image 89 will be displaced in the +x-direction; this is denoted by 87' and 89', respectively, in FIG. 5b and by arrows 91 and 93, respectively, in FIG. 5a. FIG. 5b clearly shows the effect of the double-reflecting semi-prism 83. The light emerging from the displaced fiber end 85' is reflected, via the semitransparent mirror 81, onto a face 83a and therefrom onto a face 83b, after which the light leaves the semi-prism 83 and forms an image 89'. The light transmitted by the mirror 81 forms the image 87'. Thus, the position of an incident light beam is reversed in the semi-prism 83, with the result that a light beam which enters one half leaves the semi-prism 83 via the other half in a mirror-imaged manner with respect to the axis 83c.

As a result of the rotary movement of the optical subsystem, the images 87 and 89 describe circular paths. When the fiber end 85 is displaced, like in the example shown, the images are displaced in the direction denoted by the arrows 91 and 93, the latter direction extending according to a line which is tangent to the circular image caused by rotation of the optical subsystem. (The circular images are only partly shown in broken lines for the sake of simplicity). As a result, the shifting of the image 89 is difficult to observe. In order to facilitate the observation, the semi-prism 83 is tilted slightly about an axis parallel to the x-axis as diagrammatically shown in FIG. 5c, with the result that the image 89 is shifted towards the x-axis and rotated around an axis O, so that the image 89 ultimately reaches the position 95 on the x-axis. The tilting and the rotation of the semi-prism 83 are denoted by arrows 97 and 99, respectively, and the associated shifts of the image 89 are denoted by arrows 101 and 103, respectively. A displacement of the fiber end 85 in the x-direction then also causes a displacement of the image 89 in the x-direction. The displacement, however, is then directed perpendicular to the circumference of the circular image, so that a clearly visible displacement of the one image with respect to the other image takes place.

Figure 6A:
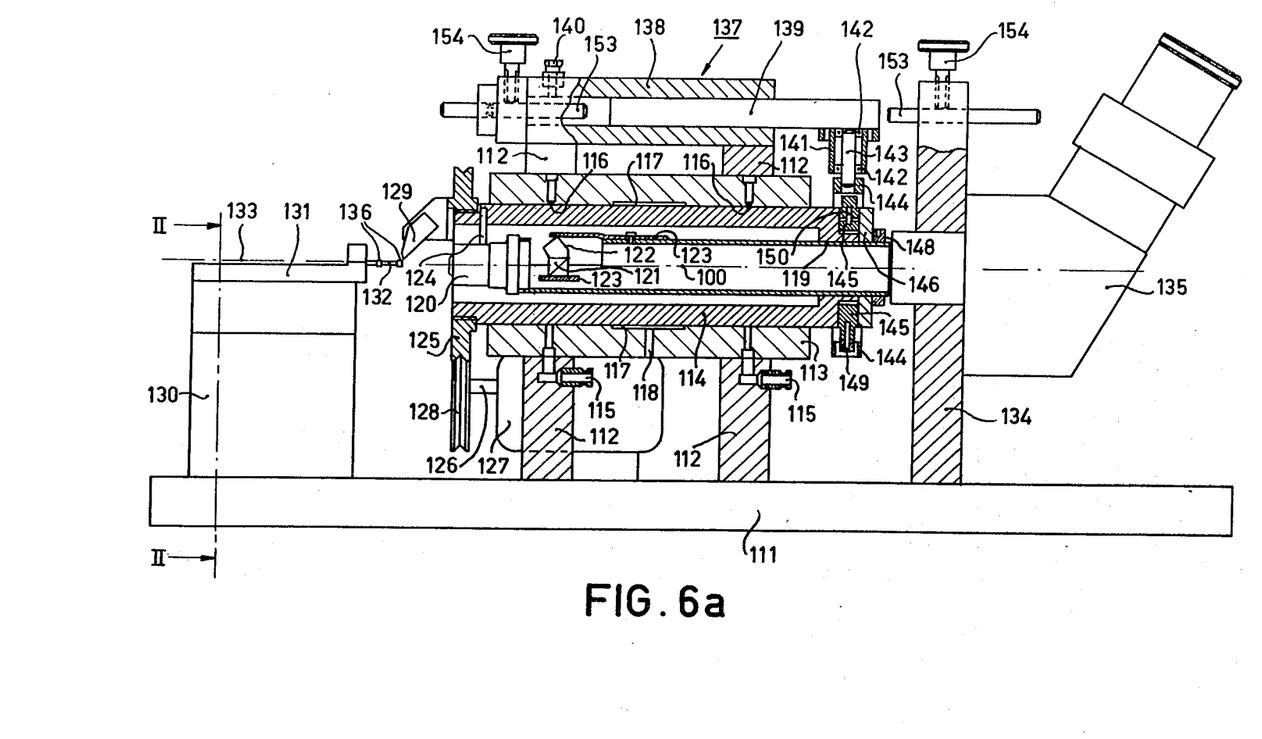
FIGS. 6a and 6b show a preferred embodiment and a detail, respectively, of a device according to the invention.

The preferred embodiment of the device according to the invention, which is shown in FIG. 6a, comprises a frame 111 with supports 112 on which a tubular holder 113 bears. In the holder 113 a tubular housing 114 is journalled which is rotatably arranged on an air bearing. The supports 112 comprise connection nipples 115 for the supply of air required for the bearing. Via the openings 116, the air finds its way, between the holder 113 and the housing 114, collects in the annular opening 117, and is discharged via an outlet opening 118. A tube 119 is screwed to one side of the housing 114, the other side of the tube 119 accommodating an objective 120, a semitransparent mirror in the form of two prisms 121, which are stacked one on the other, and a pentaprism 122. The prisms 121 and 122 are clamped and/or glued between supporting plates 123. The objective 120 is screwed into the end of the tube 119. For adjustment of the eccentricity of the objective 120 with respect to the axis of rotation 100 of the housing 114, inside the housing 114 there is provided a screw 124 whereby an optical axis of the objective 120 is pushed out of the center (axis of observation and rotation 100) of the housing 114. On the housing 114 there is provided a pulley 125 whereby, using an electric drive motor 127, the housing 114 is rotated by a pulley 128 arranged on a shaft 126 of the electric motor 127 (a belt running over the pulleys 125 and 128 for this purpose is not shown for the sake of clarity). A machining tool 129 is also mounted on the pulley 125.

Figure 6B:
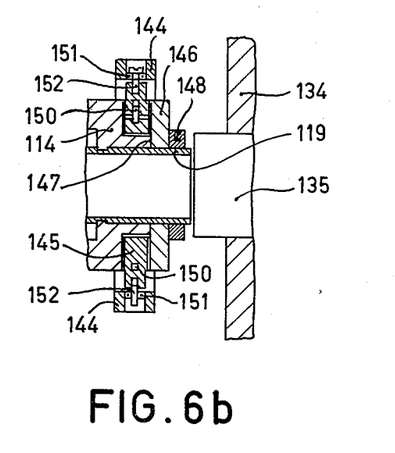
Figure 7:
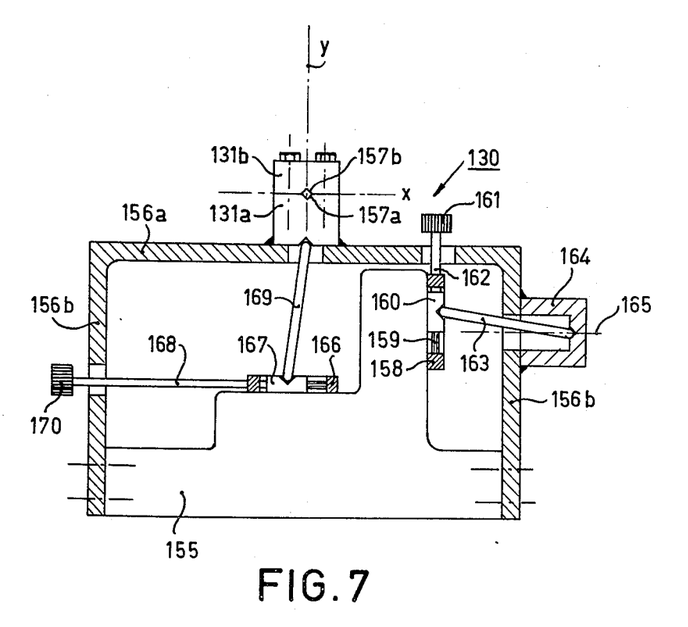

A micromanipulator 130, to be described with reference to FIG. 7, is also mounted on the frame 111. The micromanipulator comprises a support 131 in which an end 133, comprising an envelope 132, of a monomode optical fiber is clamped. During rotation of the housing 114, the images of the light emitted by the end 133 are observed via a microscope 135 which is connected to a further support 134. Using the micromanipulator 130, the fiber end 133 is positioned so that the two images formed by the rotating objective 120 and the rotating prisms 121 and 122 are concentric. Subsequently, the abutment edges 136 formed on the envelope 132 are machined by translation of the complete housing 114 along the axis of rotation 100. To this end, the device comprises an adjusting device 137, which is mounted on the supports 112. The adjusting device 137 comprises a cylinder 138 which accomodates a piston 139. Via an inlet/outlet opening 140, the piston 139 can be forced into/drawn out of the cylinder 138 by excess pressures/under pressure. A coupling bushing 141 is connected to the piston 139, the bushing accomodating a coupling rod 143 which is journalled in two bearings 142. The coupling rod 143 engages an outer ring 144, in which an inner ring is suspended in a cardan mount as shown in FIG. 6b. The inner ring 145 is located between the housing 114 and a washer 146 which abuts against an abutment edge 147 (FIG. 6b) of the housing 114, and is maintained in position by a fixing ring 148. Together with the inner ring 145, the washer 146, the abutment edge 147 and the housing 114 constitute an air bearing; for this purpose, the inner ring is provided with an air inlet opening 149 and a distribution duct 150. Thus, the housing 114 can rotate in an unimpeded and vibration-free manner with respect to the inner ring 145. Such an arrangement increases the ultimate accuracy of the envelope 132.

When the piston 139 is moved, the outer ring 144 and the inner ring 145 are taken along via the coupling rod 143. During its rotation, the housing 114 is thus translated along its axis of rotation 100. During the machining of the abutment edges 136 by means of the tool 129, the abutment edges 136 are thus always provided with outer surfaces which are concentric to the axis of observation and rotation 100. Therefore, the outer surfaces must be concentric to the fiber core, because this core is concentrically positioned with respect to the axis of observation and rotation 100. The only feasible error is inaccurate positioning of the fiber core with respect to the axis of rotation of the housing 114. When two envelopes of fiber ends are machined in direct succession, there will not even be a difference in the diameter of the envelopes to be coupled.

The adjusting device 137 furthermore comprises two abutments 153 which limit the stroke of the piston 139 and which are fastened after being adjusted by means of adjusting screws 154.

FIG. 6b shows the cardan mount suspension of the inner ring 145 in the outer ring 144. The outer ring 144 is provided with two diametrically opposed openings in which bearings 151 are accommodated. In the bearings 151 there are provided bolts 152, the thread of which engages the inner ring 145. The other reference numerals used in FIG. 6b correspond to the reference numerals used in FIG. 6a and have been included for the clarity of FIG. 6b.

The micromanipulator 130 shown in FIG. 7 comprises a rigid base 155 to which a frame comprising an upper side 156a and two sidewalls 156b is secured. On the upper side 156a of the frame there is provided the support 131 which comprises two solid blocks 131a and 131b, each of which comprises a V-shaped groove 157a and 157b. Blocks 131a and 131b are detachably connected to each other for clamping an envelope around a fiber end as shown in FIGS. 1 and 6a.

On the base 155 there is mounted a frame 158 in which a slide 160 can be displaced along a groove 159 by operation of a knob connected to a spindle 162. When the slide 160 is displaced in the y-direction, a U-shaped projection 164 is displaced in the +x-direction via a push rod 163. The two sidewalls 156b then behave as two leaf springs which support the upper side 156a and which are, therefore also displaced in the x-direction. Due to the high transmission ratio of the described mechanism (rotary movement of spindle 162, translation of slide 160, tilting of push rod 163, deflection of sidewalls 156b), co-determined by the magnitude of the angle enclosed by the push rod 163 and an axis 165 parallel to the x-direction, very accurate positioning in the x-direction is achieved. The adjusted position is maintained by a rugged, stable construction.

The y-position of the support 131 can be adjusted in the same manner as an x-position by means of a frame 166 mounted on the base 155, a slide 167, a spindle 168 and a push rod 169. Using the micromanipulator 130 shown, very accurate positioning can be achieved, an envelope clamped around a fiber end in the support 131 then having a stable position which does not change during the machining of the envelope or the abutment edge (edges) thereof.

Furthermore, it can be seen that a y-(x)-position adjusted by means of the knob 170 (161) is somewhat influenced by operation of the knob 161 (170) for adjusting the x-(y)-position. However, this influence is not disturbing for the purpose for which the micromanipulator 130 is used, because the adjustment of the x- and y-positions is continuously observed (FIG. 6a).

Figure 8:
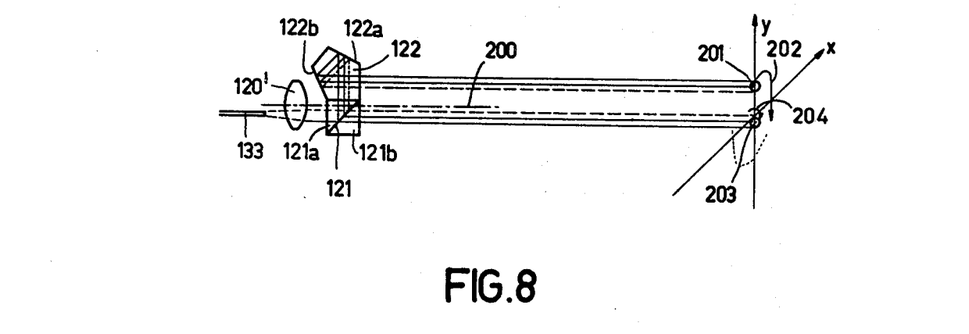
FIG. 8 shows a preferred embodiment of an optical system for a device according to the invention.

FIG. 8 shows a preferred embodiment of an optical subsystem used in the device according to the invention which is described with reference to FIGS. 6a and 6b. The subsystem comprises an objective lens 120', a semitransparent mirror 121 which is formed by the interface of two stacked delta prisms 121a and 121b, and a pentaprism 122. The axis of observation and rotation 100 (FIG. 6a) extends through the origin of the x-y-coordinate system and parallel to the optical axis 200 of the objective lens 120'. The optical axis 200 is situated in a plane which is defined by the y-axis and the axis of observation and rotation. The prisms 121a and 121b and 122 are stacked in the +y-direction. The light emitted by the fiber end 133 is incident, via the objective lens 120', on the semitransparent mirror 121. The part of the light transmitted by the mirror 121 forms a light spot 203 on the y-axis. The part of the light which is reflected by the mirror 121 forms a light spot 201 on the y-axis after reflection from the prism faces 122a and 122b. These light spots 201 and 203 are situated each on a different side of the origin of the x-y-coordinate system. When the optical system 120', 121, 122 is rotated around the axis of observation and rotation 100, the light spots 201 and 203 will form luminescent circles as denoted by arrows 202 and 204. When the fiber end is situated on the axis of observation and rotation 100, the two circles will be concentric. When the fiber end 133 is moved, for example along the y-axis, the light spot 203 will move in the -y-direction and, due to the reflection of the light from the (semi) reflective surfaces 121, 122a and 122b, the light spot 201 will move in the +y-direction. Using the optical subsystem according to FIG. 8, therefore, the same effect is obtained as with the systems described with reference to FIGS. 4a, 4b, 5a, 5b and 5c, but the system of FIG. 8 offers the major advantage that it is rugged and that its optical adjustment is very simple.

What is claimed is:

1. A method of providing an envelope on an end of an optical fiber, said envelope having an outer surface which is at least partly concentric with a light-conductive core of the fiber end, said method comprising the steps of:
   positioning the fiber end opposite an optical observation means having an axis of observation;
   radiating light into the fiber such that the light emerges from the fiber end and is incident on the optical observation means;
   observing the light beam emerging from the optical observation means; and
   displacing the fiber end transverse to the axis of observation until the observed light beam occupies a predetermined position with respect to the axis of observation;
   CHARACTERIZED IN THAT the method further comprises the steps of:
   providing an envelope on the fiber end;
   arranging the fiber end in a support;
   splitting the light beam emerging from the fiber end into two subbeams by a beam-splitting assembly, said beam-splitting assembly having an optical axis which is eccentric with respect to the axis of observation;
   rotating the beam-splitting assembly around the axis of observation, each of said subbeams tracing a circular image, movement of the fiber end in a direction tranverse to the axis of observation causing the circular images to move transverse to the axis of observation and in opposite directions with respect to each other;
   observing the circular images to determine whether they are concentric or eccentric;
   moving the fiber end and the envelope transverse to the axis of observation until the circular images are concentric, if the circular images were initially eccentric, the light-conductive core then being situated on the axis of observation; and
   machining at least a part of the outer surface of the envelope to be concentric with the axis of observation by means of a machining tool which rotates around the axis of observation of the optical observation means.

2. A method as claimed in claim 1, CHARACTERIZED IN THAT the step of moving the fiber end and the envelope comprises first moving them in one direction and then in another direction which is transverse to the first direction, both directions being transverse to the axis of observation.

3. An optical fiber having an envelope on an end thereof, said envelope having an outer surface which is at least partly concentric with a light-conductive core of the fiber end, as made by the method of claim 1 or 2.

4. An optical fiber as claimed in claim 3, CHARACTERIZED IN THAT the envelope has at least one but no more than two abutment edges having outer surfaces which are concentric to the light-conductive core of the fiber end.

5. A device for providing an envelope on an end of an optical fiber, said envelope having an outer surface which is at least partly concentric with a light-conductive core of the fiber end, said device comprising:
   a frame having a support in which the fiber end with the envelope can be secured;
   adjusting means for adjusting the position of the support with respect to the frame; and
   optical means, having an axis of observation, for observing a light beam emerging from the end of the optical fiber;
   CHARACTERIZED IN THAT the optical means comprise a beam-splitting assembly which splits the light beam emerging from the fiber into two subbeams, said beam-splitting assembly having an optical axis which is eccentric with respect to the axis of observation, and the device further comprises;
   machining means arranged to be rotatable, together with the beam-splitting assembly, around the axis of observation in order to machine at least a part of the outer surface of the envelope; and
   drive means for rotating the beam-splitting assembly and the machining means around the axis of observation.

6. A device as claimed in claim 5, CHARACTERIZED IN THAT the support is displaceable parallel to the axis of observation with respect to the frame.

7. A device as claimed in claim 5, CHARACTERIZED IN THAT the machining means and the beam-splitting assembly are displaceable parallel to the axis of observation with respect to the frame.

8. A device as claimed in claim 5, CHARACTERIZED IN THAT the beam-splitting assembly comprises an objective, a semitransparent mirror, and a pentaprism, an optical axis of the objective extending outside the axis of observation and substantially parallel thereto, the optical axis and the axis of observation enclosing an angle of substantially 45° with the semitransparent mirror which transmits a part of the light transmitted by the objective and which reflects the remaining part to the pentaprism which reflects the light in a direction which is substantially the same as that followed by the part of the light transmitted by the mirror.

9. A device as claimed in claim 5, 6, 7, or 8, CHARACTERIZED IN THAT the drive means comprises:
   a pulley mounted on a housing;
   an electric motor, having a shaft with a second pulley attached thereto, mounted on the frame; and
   a flexible, elastic drive belt mounted on the two pulleys.

10. A device as claimed in claim 9, CHARACTERIZED IN THAT the housing is translatable in a holder on the frame by means of an adjusting device, the housing being coupled to the adjusting device by way of an inner ring and an outer ring, said inner ring being suspended in the outer ring in a Cardan mount, said housing and said inner ring forming an air bearing.

11. A device as claimed in claim 10, CHARACTERIZED IN THAT the adjusting device comprises:

a cylinder connected to the frame;

a piston, accommodated in the cylinder, said piston being driven by pressure which is different from an ambient pressure; and a coupling rod, oriented transverse to the direction of movement of the piston, said coupling rod arranged to be rotatable around its axis in bearings.

12. A device as claimed in claim 5, 6, 7, or 8, CHARACTERIZED IN THAT the means for adjusting the position of the support comprise a micromanipulator which is mounted on the frame.

13. A device as claimed in claim 12, CHARACTERIZED IN THAT the micromanipulator comprises:

a rigid base, a supporting wall, and two side walls therebetween;

a frame, supported by the base, in which a slide is arranged to be displaceable parallel to either a side wall or the supporting wall; and a push rod, clamped between the slide and either the side wall or the supporting wall elastically deforming either the side wall or the supporting wall, the push rod enclosing an acute angle with a direction perpendicular to either the side wall or the supporting wall.

14. A device as claimed in claim 5, CHARACTERIZED IN THAT the beam-splitting assembly comprises an objective lens and a reversing prism secured in a housing, said machining means comprising a tool which is mounted on the housing, said housing being mounted by way of an air bearing, in a holder on the frame, to be rotatable around and translatable along the axis of observation.

* * * * *